United States Patent
Fletcher et al.

(10) Patent No.: US 8,655,544 B2
(45) Date of Patent: Feb. 18, 2014

(54) SYSTEM AND METHOD FOR TRACKING VEHICLE MILEAGE WITH MOBILE DEVICES

(75) Inventors: William Fletcher, Westlake Village, CA (US); Douglas MacGlashan, Redondo Beach, CA (US); Brian Billett, Los Angeles, CA (US); Ujjual Nath, Manhattan Beach, CA (US); Gaurav Sharma, Irvine, CA (US)

(73) Assignee: Kaarya LLC, Torrance, CA (US)

( * ) Notice: Subject to any disclaimer, the term of this patent is extended or adjusted under 35 U.S.C. 154(b) by 0 days.

(21) Appl. No.: 13/365,255

(22) Filed: Feb. 2, 2012

(65) Prior Publication Data

US 2012/0197484 A1 Aug. 2, 2012

Related U.S. Application Data

(60) Provisional application No. 61/438,655, filed on Feb. 2, 2011.

(51) Int. Cl.
*G06F 7/00* (2006.01)
(52) U.S. Cl.
USPC ........................................................ 701/32.5
(58) Field of Classification Search
USPC ........... 701/29.1, 29.4, 31.4, 31.5, 32.3–32.7, 701/33.4, 465, 468; 361/679.3; 455/41.2
See application file for complete search history.

(56) References Cited

U.S. PATENT DOCUMENTS

| | | | |
|---|---|---|---|
| 3,792,445 A | 2/1974 | Bucks et al. | |
| 4,258,421 A | 3/1981 | Juhasz | |
| 5,515,043 A | 5/1996 | Berard | |
| 5,928,292 A | 7/1999 | Miller | |
| 6,295,492 B1 | 9/2001 | Lang | |
| 6,636,790 B1 | 10/2003 | Lightner | |
| 6,826,473 B1* | 11/2004 | Burch et al. | 701/467 |
| 6,973,387 B2 | 12/2005 | Masclet | |
| 6,988,033 B1 | 1/2006 | Lowrey et al. | |
| 7,522,069 B2 | 4/2009 | Tunnell et al. | |
| 8,031,077 B2 | 10/2011 | Derrick | |
| 2006/0184456 A1 | 8/2006 | Janasz | |
| 2007/0032225 A1 | 2/2007 | Konicek | |
| 2007/0229350 A1* | 10/2007 | Scalisi et al. | 342/350 |
| 2008/0109158 A1* | 5/2008 | Huhtala et al. | 701/208 |
| 2008/0158018 A1 | 7/2008 | Lau | |
| 2009/0268030 A1* | 10/2009 | Markham | 348/158 |
| 2010/0063904 A1 | 3/2010 | Ronen | |
| 2010/0099437 A1* | 4/2010 | Moerdijk | 455/457 |
| 2010/0227586 A1 | 9/2010 | Reich | |
| 2011/0105097 A1* | 5/2011 | Tadayon et al. | 455/418 |
| 2012/0150381 A1 | 6/2012 | Nath | |

OTHER PUBLICATIONS

Print out of web page http://torque-bhp.com/wiki/Main_Page retrieved on Jul. 30, 2012. Main Page for Torque OBD2 Wiki.

(Continued)

*Primary Examiner* — Mary Cheung
(74) *Attorney, Agent, or Firm* — Brian Billett

(57) ABSTRACT

Disclosed is a system for tracking vehicle locations and accumulating mileage for said vehicles by detecting intervals when said vehicles are in proximity to mobile devices and utilizing the location aware sensors of said mobile devices to determine vehicle locations. Proximity between mobile devices and vehicles is determined by short range data communication identification. Multiple vehicles and drivers may thus be tracked for trip, interval, or overall mileage traveled.

8 Claims, 6 Drawing Sheets

(56) References Cited

OTHER PUBLICATIONS

Palmer Performance Engineering, print out of web page http://www.palmerperformance.com/products/dashcommand/index.php retrieved on Jul. 30, 2012. Main Page for Dashcommand software.
Calabrese, Colonna, Lovisolo, Parata, Ratti, Real-time Monitoring Using Cell Phones: A Case Study in Rome. IEEE Transactions on Intelligent Transport Systems, Mar. 2011 vol. 12, Issue 1, pp. 141-151.
Web page:www.workinfield.com, retrieved on May 16, 2013. Work in field s.r.o. Grosslingova, Slovak Republic, p. 4 "one tap is all it takes".
web page: http//www.zonewalker,cin/acar/screen-shots, relieved on May 16, 2013. Zonewalker LLC, p. 9 "starting a trip".

* cited by examiner

| | Toyota Prius | Chevy Volt | BMW 528 | Vehicle |
|---|---|---|---|---|
| Smartphone | 00:0A:AB:24:88:32 | 00:0A:F7:21:31:EE | 00:01:A9:82:F3:18 | MAC ID |
| Driver A iPhone | 150.24 miles | 81.3 miles | 3.5 miles | |
| Driver B Android | 22.1 miles | 220.24 miles | 0 miles | |
| Driver C Blackberry | 13.1 miles | 0.9 miles | 420.2 miles | |
| Total Mileage | 185.44 miles | 302.24 miles | 423.7 miles | |

Correlation between smartphone and vehicle/onboard wireless device MAC ID

Figure 6

SYSTEM AND METHOD FOR TRACKING VEHICLE MILEAGE WITH MOBILE DEVICES

This application for patent claims priority from provisional patent application 61/438,655.

FIELD OF THE INVENTION

The present invention is generally in the field of virtual vehicle sensor systems and vehicle information systems. Specifically, the invention is within the field of the use of mobile devices such as smart phones, for vehicle telematics applications.

BACKGROUND

Vehicle mileage is tracked and recorded for a variety of functions. In general, vehicle mileage is a measure of the cost associated with operating the vehicle, as well as a measure of the wear to a vehicle. Mileage may be relevant for individual vehicle trips, for longer term intervals of mileage or time, for accumulated mileage by individual drivers, and for the overall accumulated of the vehicle.

Vehicle mileage intervals are commonly used as the primary means for determining scheduled maintenance of vehicles. Manufacturers and car dealers specify recommended or warranty required maintenance intervals which are typically based on the distance the vehicle has been driven, sometimes in conjunction with calendar intervals. For example, recommending an oil change every 7,500 miles or 6 months. A few automobile manufacturers include on-board computer devices for notifying the driver that scheduled service is recommended, but most do not. Thus scheduled service is easily missed, particularly if the driver is unaware of the schedule, or when the last service was performed. Additionally, service interval information is generally unavailable to interested and authorized third parties, such as dealerships or other repair facilities. With such information available, these third parties would have an opportunity to offer timely premium and discounted services directly and tailored to the individual needs of the vehicle owners.

Individual vehicle trips driven by a vehicle are commonly logged as a measure of cost. Such cost may then be assigned to an individual or purpose as an expense. Without a data connection to the vehicle, this is a tedious process at best. A vehicle owner may wish to track the mileage driven by multiple drivers of a single vehicle. A useful extension of this capability is to track the driven mileage on multiple vehicles and by one or more drivers, such as in a family, a set of company vehicles, or in a municipal vehicle fleet. The collection and tracking of such vehicle information are well known vehicle telematics applications.

Solutions to mileage tracking and corresponding telematics applications invariably utilize some combination of vehicle sensors and aftermarket installed hardware in the vehicle. For example, a number of systems have been proposed or are on the market, such as in Lightner U.S. Pat. No. 6,636,790, which utilize on-board diagnostic (OBD II) data available with vehicles manufactured after 1996. For such aftermarket systems, the installed device connects into the vehicle OBD II port and must reliably accept the input in a considerable number of different data protocols and from proprietary data feeds. An additional difficulty with these devices is interference with the diagnostic process, as service technicians normally use the OBD II port for scanning the car's computer systems for fault codes, which help in the diagnosis of the vehicle problems. This typically requires that the aftermarket add on device be uninstalled and the dealer's scan tool attached to the port. After the procedure is done, the device has to be installed and the setup routine must be performed and the device must be re-configured. Additionally, due to the security sensitive nature of the information, including potential modification of the data if access is available, distance traveled is generally not a record available through the OBD II data connection. The accumulated mileage value must be estimated or inferred from other available sensor data, which may be impossible without a reference value.

Other approaches to location tracking and accumulated mileage include the use of a location aware sensor in a device, such as in a GPS based navigation system, see Villevielle 55433802. Similar systems are available for vehicle navigation tracking and personal sports navigation. As applied to a vehicle system, however, these systems have significant shortcomings, including no capability to reliably couple the use of the device in conjunction with a particular vehicle, no capability to integrate with other drivers in records for a single vehicle, and no capability to identify and segregate mileage for a single driver among multiple vehicles.

Currently, no system is available for accumulating, recording and communicating the mileage of one or more vehicles by one or more mobile devices automatically, utilizing only the sensor systems available to the mobile device, and minimal user input.

SUMMARY OF THE INVENTION

In accordance with the invention, the problem of logging vehicle mileage with a mobile device or mobile phone is solved by detecting the proximity of an identified vehicle by a mobile device or mobile phone and logging mileage calculated by the phone's location aware system while the vehicle remains in proximity to the device. Proximity of the vehicle to the mobile device or mobile phone is determined by the detection of a predetermined short-range data communication device identification connected to the vehicle. The invention is extended to a system of multiple vehicles and multiple mobile devices by communicating compiled mileage data from individual devices to a central repository and then aggregating data assigned to vehicles. Thus, without any data connection to vehicle sensors, the present invention provides the capability for tracking the distance(s) traveled by one or more vehicles each driven by one or more drivers.

It is an object of the present invention to log or track accrued vehicle mileage for vehicle owners or drivers without utilizing a data connection to the vehicle and only sensor systems available on the driver's or operator's mobile phone.

It is an object of the present invention to utilize a mobile telephone equipped with a location aware system such as GPS, and wireless short range data system such as Bluetooth® to automatically distinguish motion associated with a vehicle and driver, and accrue the logged distance traveled by the vehicle.

It is an object of the present invention to utilize a mobile telephone equipped with a wireless short range data system such as Bluetooth® to determine proximity to a specific vehicle equipped with an on-board wireless short range data system compatible with the system available on such mobile phone.

It is an object of the present invention to perform such proximity detection between the mobile phone and the vehicle by using the mobile phone to search for or detect any nearby wireless devices with identification, such as MAC addressing, which matches one or more device identifications registered by the mobile phone.

It is an object of the present invention to monitor vehicle location utilizing a mobile phone location awareness system and record a log of accrued distance traveled which has been filtered for incidental motion of the phone while in proximity of the vehicle.

It is an object of the present invention to monitor mileage driven for a plurality of vehicles driven by a plurality of drivers by correlating driver mobile phones with vehicle motion while in proximity to corresponding mobile phones having predetermined identifying information regarding each vehicle.

It is an object of the present invention to utilize a remote data hub for the communication of logged vehicle mileage data from one or more mobile phones correlated to one or more specified vehicles.

It is an object of the present invention to utilize a short range wireless data communication technology, including these example currently available technologies: Bluetooth®, Near Field Communication (NFC), Radio Frequency Identification (RFID), 802.11 Wifi, ZigBee (802.15.4), or wireless USB (WUSB) as proximity detection method by matching the identification of nearby devices, such as by the Media Access Control address (MAC address), against a list of stored identified devices.

BRIEF DESCRIPTION OF THE DRAWINGS

FIG. 6 presents a chart depicting an example compilation of mileage logged by three drivers associated with three vehicles. A central data hub compiles the respective mileage data from each driver communicated to it.

DETAILED DESCRIPTION OF THE INVENTION

Figure 1:
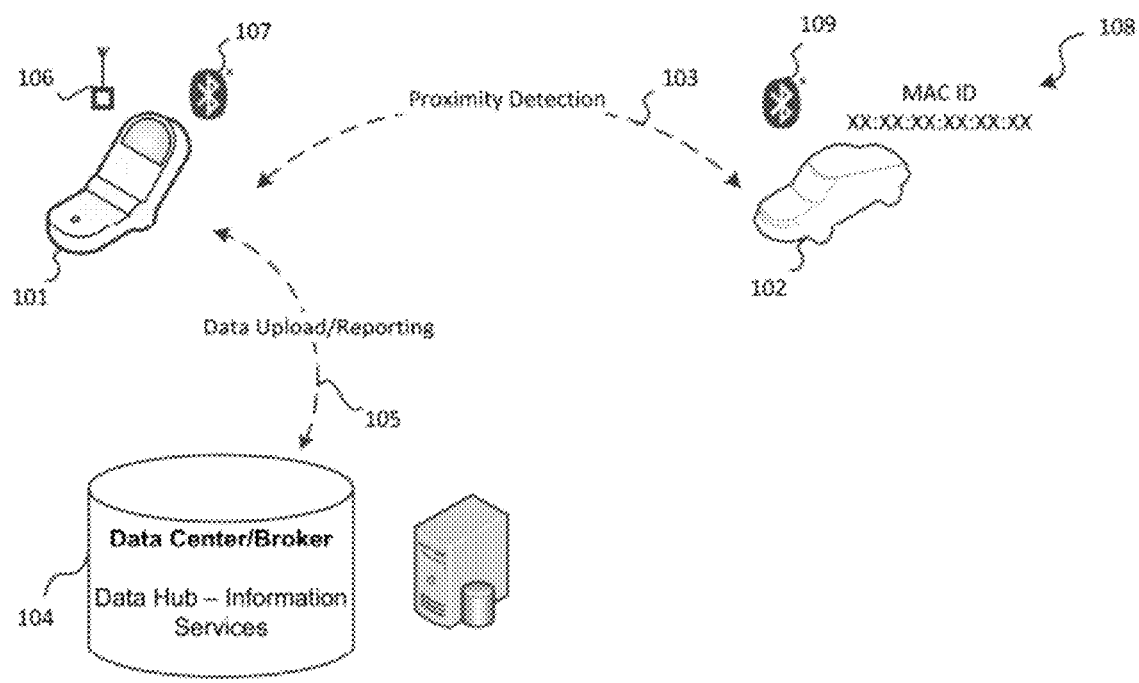
FIG. 1 is a depiction of the system components for an embodiment of the invention that includes a single user/driver, a single vehicle, and an optional data hub.

As shown in FIG. 1, the system and method of the most simple embodiment of the invention is formed by mobile phone 101, equipped with both a short range data communication system 107, shown in this embodiment as Bluetooth®, and a location aware system 106 (GPS in the US), and a vehicle 102 with a matching on-board short range data connection capability 108 and 109. Such on-board system could be any number of available systems, including an original equipment manufacturer (OEM) installed hands-free audio system, an after-market hands-free device, or something as simple as Bluetooth® key or luggage finder, which could be left in the vehicle to operate as the vehicle proximity beacon.

The location aware system 106 embedded within the phone may utilize any available wireless location awareness system, including but not limited to GPS, GNSS, GLONASS, BD2, cellular tower triangulation, or Wi-Fi triangulation. This described embodiment of the invention utilizes the GPS system, which has been mandated as a component of mobile phones in the United States by the FCC since 2005.

GPS or the Global Positioning System consists of a system of global satellites which continuously transmit very precise time signals via radio frequency broadcasts directed to the earth surface. Devices utilizing GPS for location awareness infer the latitude, longitude, time, and elevation of the receiving device based on the differential between the timing of received GPS satellite broadcast signals. These 4 input parameters: latitude, longitude, elevation, and time, are the sensors utilized by the present invention for determining the distance traveled. Although in theory GPS systems are capable of absolute accuracy, in practice GPS systems are susceptible to multiple sources of error, including error and noise introduced from the ionosphere, troposphere, measurement, ephemeris data, clock drift, and multi-path error. Of concern to the present invention is the potential for the introduction accumulating positional error which the GPS system is stationary. One solution to the mitigation or reduction in GPS error is the utilization of system augmentation. GPS augmentation systems currently include Wide Area Augmentation System (WAAS), European Geostationary Navigation Overlay Service (EGNOS), Differential GPS, Inertial Navigation Systems (INS) and Assisted GPS. Current GPS systems not utilizing augmentation have been reported to have a mean signal error for a stationary device of approximately a radius of 6.5 meters for 95 percent of the location samples. An accumulation of several miles per day is possible if the sampling rate is high enough and a mobile phone remains in the vehicle for extended periods of time. Methods for addressing this problem are discussed below and addressed in different embodiments of the present invention.

A number of systems are available for developers to access the location based service capability of a mobile phone through and software development kit (SDK) and application programming interface (API). On an embodiment of the invention which utilizes the mobile phone Android OS, an API is available known as the LocationManager for accessing the location aware system of the phone. See: http://developer.android.com/reference/android/location/LocationManager.html.

Short range wireless data provides a bidirectional means for transferring data over distance as short as a few inches of a hundred yards, depending on the technology used. Available short range wireless technologies which could be utilized by the present invention include: Bluetooth®, Near Field Communication (NFC), Radio Frequency Identification (RFID), 802.11 Wifi, ZigBee (802.15.4), and wireless USB (WUSB). The preferred embodiment for the present invention incorporates as its short range wireless data system is Bluetooth®, which has an effective range of ~1 meter, ~10 meters, or ~100 meters, depending on the power class configuration of the device. The majority of Bluetooth® capable smart phones are Class 2 devices, which gives them a typical range of 30 feet.

Smartphone operating systems generally provide one of more API's for accessing the embedded short range data wireless technology available by the phone. In the preferred embodiment which uses Bluetooth®, one embodiment of the system includes smartphones which use the Android operating system (OS). The Android smartphone OS offers a number of API's in its android.bluetooth package which provide access to Bluetooth® functionality. See: http://developer.android.com/guide/topics/wireless/bluetooth.html.

In an embodiment of the current invention, an application on the smartphone periodically turns on Bluetooth® scanning for the MAC address 108 of a Bluetooth® device onboard the target vehicle 102A. In an embodiment of the invention which utiltizes the Android operating system and android.bluetooth, the system call getremoteDevice( ) performs this functionality. A scan for remote devices to discover a device the specified MAC address indicates that the device and vehicle are within the communication range and thus proximity to the vehicle. Note that this aspect of the invention does not require the smartphone to actually form a bi-directional paired data connection with the vehicle's on board system. This aspect of the invention is particularly useful in the invention embodiment configuration which includes multiple users and multiple vehicles. Devices utilizing the on-board OBDII port are incapable of segregating the mileage and driving behavior of individual drivers of a single vehicle. This capability of the present invention has direct potential benefits for expense reporting, fleet tracking, and insurance providers. These capabilities are provided by the embodiment depicted in FIGS. 3, 4, and 5 as described below.

FIG. 1 depicts a flow chart of an embodiment for a method for logging the specified vehicle mileage while the user's mobile phone is in proximity to the vehicle. The process begins by initiating the short range data wireless system and location aware systems available on the mobile phone 101. In this embodiment of the invention these are the Bluetooth® and GPS systems. Next the location aware system on the mobile phone initiates its satellite detection and GPS algorithm to determine the location of the phone 102.

Next the system begins its periodic scan mode for detecting proximity of the phone to the vehicle by listening for the registered MAC address of the vehicle 103. If no registered MAC addresses are found, the system waits for a configurable fixed time 107 before rescanning 103 for nearby registered vehicles. By reducing the periodic scan rate, the Bluetooth® system conserves data bandwidth and power.

If the short range wireless data system detects a specified MAC address, regardless of whether the device has been configured to pair with the phone, the phone begins to log calculated distance traveled by summing the point to point distances between GPS cycles 104. In alternate embodiments of the invention the system scans for the vehicle Bluetooth® MAC address once ever GPS cycle, or once after a predetermined plurarity of GPS sampling cycles 106. Bluetooth® scanning frequency may alternately be modified by dynamically changing the GPS sampling frequency during operation.

As discussed above, GPS systems have a number of error sources which could accumulate over time as logged mileage if the mobile phone remains in proximity to the vehicle for extended periods of stationary time. This accumulated error, if significant for a particular user of the present invention, is correctable or lessened in several different embodiments.

An embodiment of the invention where such a dynamic GPS sampling method is chosen as proportional to the detected motion of the vehicle between scans, accumulated error during prolonged periods of proximity of the phone and vehicle while the vehicle is stationary. Once the phone and vehicle proximity is determined to have ended, the system returns to the periodic scan mode 107-103.

Figure 2:
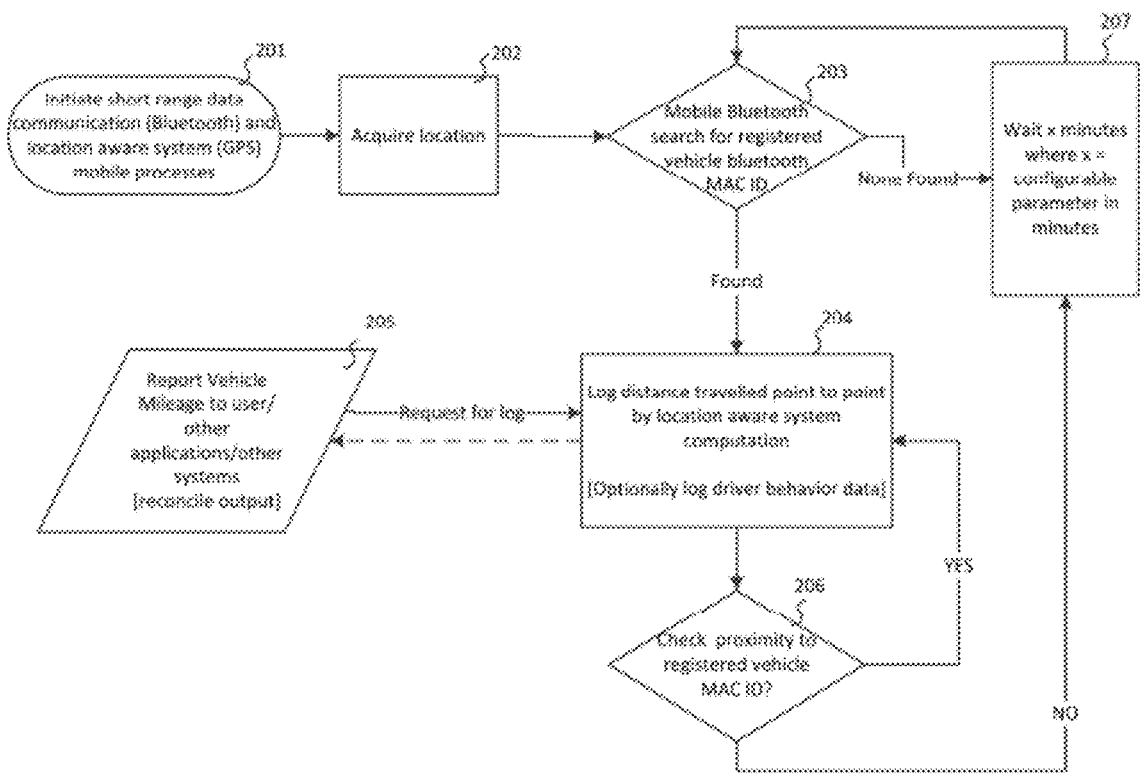
FIG. 2 is a flow chart illustrating an embodiment for tracking the mileage of a vehicle utilizing a) an available short distance wireless data connection (such as Bluetooth®) detection of a nearby device with an identification matching a pre-determined value (such as a MAC address), and b) the cell phone location awareness capabilities.

In this embodiment of the invention from FIGS. 1 and 2, vehicle mileage is accrued by an application on the mobile phone which can be queried by the user directly. In an alternate embodiment of the invention, the accrued mileage data may be passed to other applications on the mobile phone 105. In another embodiment of the invention, the mileage data may be passed by wireless data connection to a central system repository 104.

In FIG. 2, an optional embodiment of the present invention allows the user to reconcile the mobile accumulated mileage with the on-board vehicle odometer on a periodic basis by manual correction of the mileage log in 205. Manual reconciliation available to both confirm the accuracy of the operation of the invention as well as adjust for accumulated errors from the location awareness system.

Logging mileage is not the only available use for point to point GPS vehicle information. Numerous other aspects of the vehicle motion can be utilized to characterize the vehicle movement for purposes of modifying the period of scheduled maintenance. If such information is desired for analysis, it can be logged in 204 and available for upload to the data hub, user, or other application periodically by query or other data connection 205.

Figure 3:
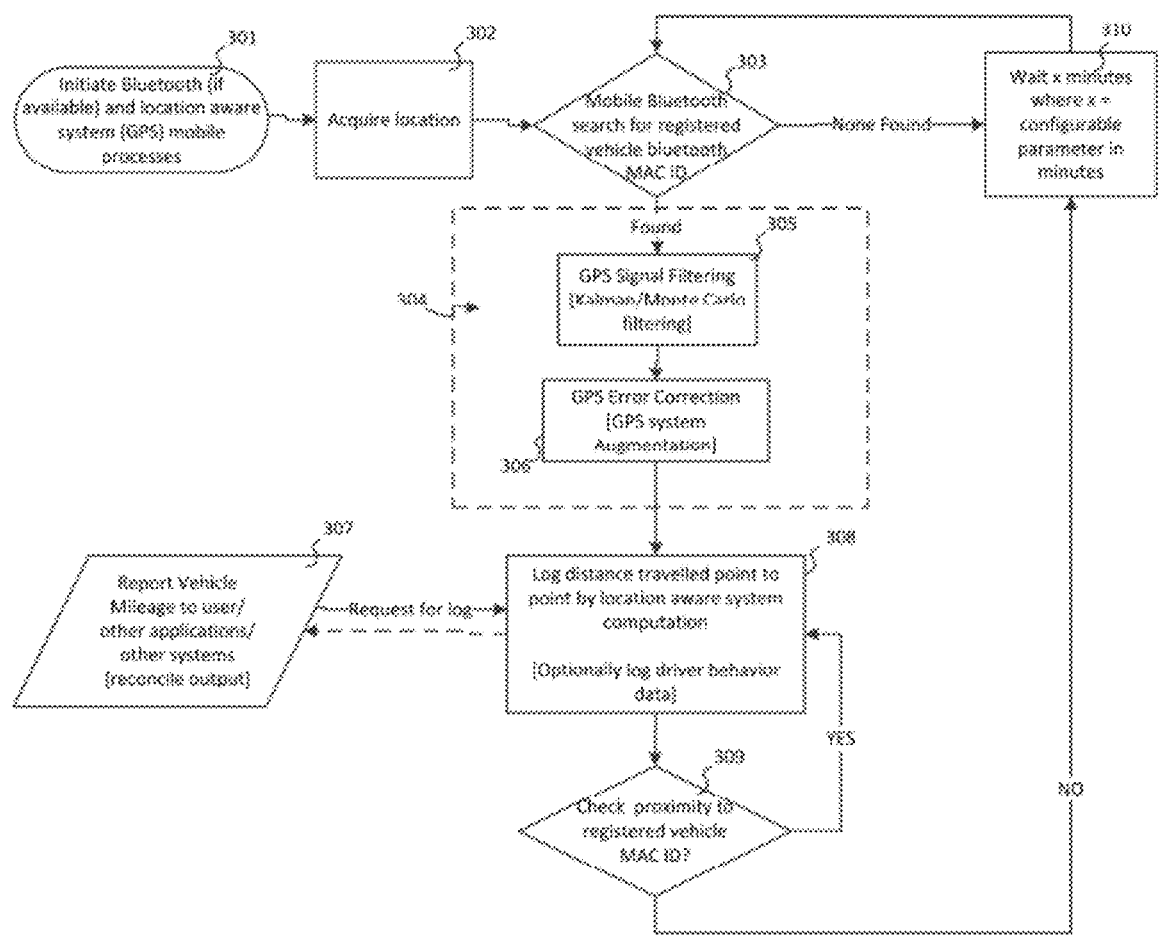
FIG. 3 is a flow chart illustrating the mileage tracking system in FIG. 1 with additional components for filtering the GPS signal and performing error correction.

FIG. 3 depicts an embodiment of the invention for improving the accuracy of the calculated vehicle mileage for systems which accumulate unacceptable error from a variety of sources as discussed above. The system steps presented in FIG. 2 for initiated the mobile phone systems and scanning for a registered MAC addresses associated with a vehicle are included unchanged in FIG. 3 steps 301, 302, 303, and 310.

The aspect of the invention for GPS signal and error correction are depicted in step 304. First, GPS signal filtering is shown in step 305 where any one of suitable published signal filtering methods or algorithms may be employed, such as Kalman filtering or a Monte Carlo filtering as a method of improving signal stability and accuracy. In step 306, if available, one of available GPS augmentation systems is implemented to improve the GPS system accuracy. Currently, the most widely used such system available for consumer GPS products is the WAAS system, which was originally implemented to improve airline location and navigation accuracy by the FAA. Although WAAS systems are not generally utilized in mobile phones, future adoption is likely as WAAS dramatically increases accuracy. Alternate embodiments for the inclusion of GPS augmentation include assisted GPS and differential GPS, also implemented in step 306. Corresponding to steps 205, 204, and 206 in FIG. 2, the steps for calculating and reporting the accrued mileage is performed in steps 307, 308, and 309.

Figure 4:
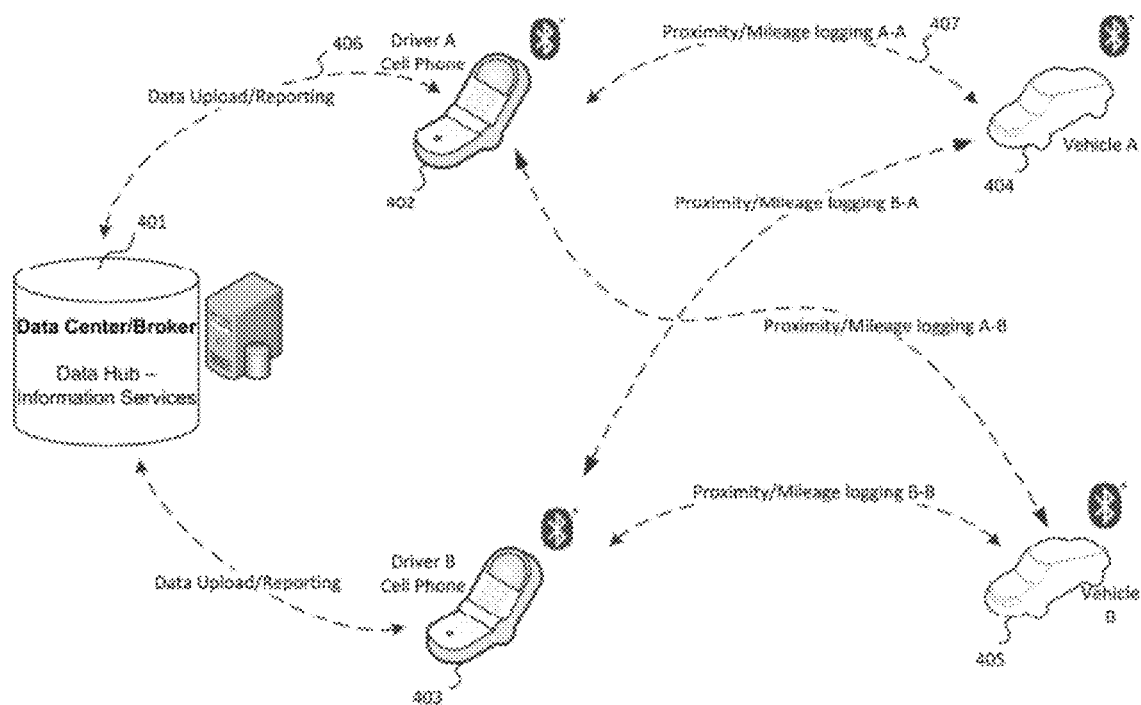
FIG. 4 is an illustration of an embodiment for a system capable of logging and tracking multiple mobile phones and multiple vehicles interchangeably while maintaining the correct aggregate mileage log for each vehicle.

FIG. 4 illustrates the embodiment of the present invention in a configuration a multiple vehicle and multiple drivers for each vehicle. As the present invention does not rely upon vehicle sensor data input, such a configuration is possible and provides important additional utility. The embodiment shown in FIG. 4 includes 2 vehicles (vehicle A—404 and vehicle B—406) and 2 drivers/mobile phones (driver A—402 and driver B—403), and a central data hub 401.

In FIG. 4, vehicle proximity detection between registered mobile phones A and B and predetermined MAC addresses corresponding to vehicles A and B is depicted by the dashed lines between the mobile phones and vehicles exemplified by the proximity detection 407 between Driver A and Vehicle A. In this embodiment of the invention, each mobile phone's accrued mileage is periodically uploaded to the central data hub 401 for compiling mileage for each vehicle accrued by multiple driver's who drive each vehicle. Independent driver behavior is available for reporting and to other applications in other embodiments of the present invention.

Figure 5:
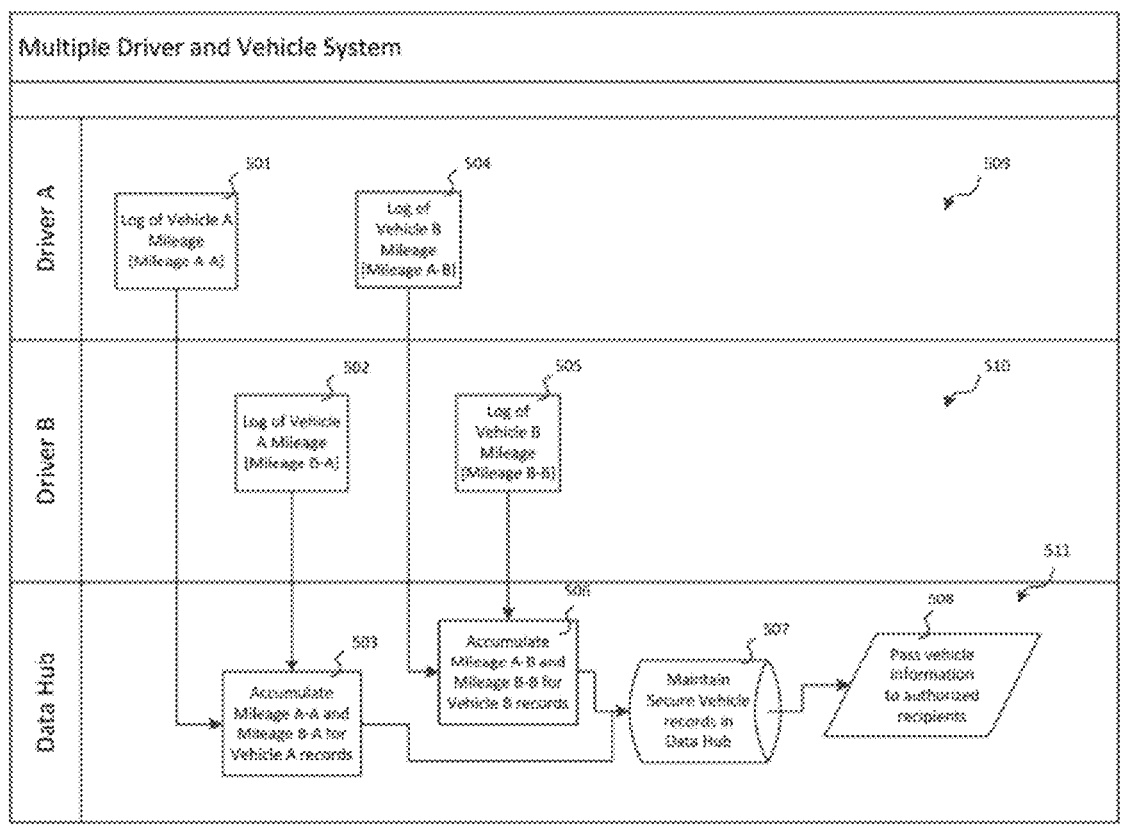
FIG. 5 is a process flow chart diagramming an embodiment for a multiple mobile phone and vehicle system utilizing a data hub center for authenticating and brokering the release of logged mileage data for each of the vehicles.

FIG. 5 depicts a swim lane flow chart illustrating the methodology for the embodiment of the invention shown in FIG. 4. In this chart, the swim lanes represent data flow which passes between devices including the mobile phone for driver A—509, mobile phone for driver B—510, and the central data hub or repository 511. Data flow begins with each vehicle compiling mileage corresponding to accrued point to point travel distance while the phone is in proximity to each registered vehicle 501, 502, 504, and 505. Periodically, the accrued mileage data for vehicle A from driver A 501 and driver B 502 is compiled and recorded by the data hub 503. Similarly, periodically the accrued mileage data for vehicle B from driver A 504 and driver B 505 is compiled and recorded by the data hub 506. These compiled records and maintained in a secure environment at the data hub 507 and can be passed to authorized recipients including applications on the driver mobile phones, or other Internet vehicle records access.

FIG. 6 is small chart depicting an example implementation of mileage tracking for vehicle records in a group of three drivers and three vehicle. In this illustrative example of the present invention, examples of MAC addresses for the three vehicles driven 601 are programmed into the driver smart phones 602 and periodically compiled to provide the detailed information shown, including accrued total mileage for each vehicle 603 and mileage driven by individual drivers for each vehicle 604.

The implications of the present invention in the numerous potential configurations and embodiments are far reaching. Since the records 507 include both driver and vehicle data, detailed reporting of data is available for mileage corresponding to each driver, optional details of driver behavior, as well as overall for each vehicle. Such detailed information is not possible by utilizing on-board vehicle sensors, as is ubiquitous prior efforts to address this problem. The potential applications for such detailed reporting and simplicity of implementation are numerous, including vehicle tracking, driver tracking, driver expense reporting and mileage records for tax reporting, and maintenance scheduling.

It will be understood that the particular embodiments described in detail herein are illustrative of the invention and that many other embodiments are applicable. The principal features highlighted herein may be employed in many embodiments within the scope of the claims.

We claim:

1. A method for collecting and communicating vehicle information comprising the steps of:

initiating without user intervention and performing data collection during intervals of time when one or more mobile devices are in proximity to one or more identified vehicles, each said mobile device including a location aware sensor, a wireless Internet data transceiver, non-volatile memory storing instructions for processing location data, a volatile memory, a central processing unit, and each said vehicle including a short range data communication device which is detected and identified by a compatible device embedded with each said mobile device;

calculating a mileage traveled by a particular identified mobile device and a particular identified vehicle, during said intervals of time;

accumulating said mileage and communicating said mileage to a central data server periodically;

wherein said short range data communication is utilized for said initiating of data collection during said proximity.

2. A method as in claim 1 wherein;

one or more said mobile devices is a smart-phone.

3. A method as in claim 1 wherein;

said location aware sensor for each mobile device is a global positioning system (GPS) sensor.

4. A method as in claim 1 wherein:

said short range data communication component of each mobile device uses the Bluetooth communication protocol.

5. A method as in claim 1 wherein:

receiving said mileage data and accumulating records for said mileage for each said mobile device on said central data server.

6. A method as in claim 1 wherein:

receiving on said central data server data queries from authorized or non-authorized users, identifying said user authority to receive said mileage data, sending requested said mileage data to said authorized users.

7. A method as in claim 1 wherein:

sending notifications from said central data server corresponding to said mobile devices including scheduled service notifications based upon accumulated mileage.

8. A method as in claim 7 wherein:

sending advertisements from said central data server to vehicle owners in conjunction with scheduled service notifications.

* * * * *